(12) United States Patent
Scappaticci

(10) Patent No.: US 12,071,088 B2
(45) Date of Patent: Aug. 27, 2024

(54) RESCUE DEVICE

(71) Applicant: KS2 Corp Inc., Montreal (CA)

(72) Inventor: Anthony Scappaticci, Montreal (CA)

(73) Assignee: KS2 CORP INC., Montreal (CA)

( * ) Notice: Subject to any disclaimer, the term of this patent is extended or adjusted under 35 U.S.C. 154(b) by 319 days.

(21) Appl. No.: 17/472,012

(22) Filed: Sep. 10, 2021

(65) Prior Publication Data

US 2022/0105889 A1   Apr. 7, 2022

Related U.S. Application Data

(60) Provisional application No. 63/086,225, filed on Oct. 1, 2020.

(51) Int. Cl.
*B60R 21/01* (2006.01)

(52) U.S. Cl.
CPC .... *B60R 21/01* (2013.01); *B60R 2021/01286* (2013.01)

(58) Field of Classification Search
CPC ..................................................... B60R 21/01
See application file for complete search history.

(56) References Cited

U.S. PATENT DOCUMENTS

| | | | | |
|---|---|---|---|---|
| 6,345,219 B1 * | 2/2002 | Klemens | ................. | B60R 21/01 340/471 |
| 6,804,595 B1 * | 10/2004 | Quail | ................ | B60R 21/01512 701/45 |
| 7,917,263 B2 * | 3/2011 | Miura | .................... | B60R 21/01 701/45 |
| 11,560,108 B2 * | 1/2023 | Balasubramanian | ........................ B60R 21/0132 | |

* cited by examiner

*Primary Examiner* — Faye M Fleming
(74) *Attorney, Agent, or Firm* — Gowling WLG (Canada) LLP

(57) ABSTRACT

The present invention discloses components adapted to provide safety features in a living compartment, including an automotive vehicle. More precisely, there is disclosed a safety system for an automotive vehicle comprising electronic control units, comprising: a safety module in communication with one or more sensors of the automotive vehicle and the one or more electronic control units, wherein the safety module, upon detection of a condition by the sensors, is designed to signal one of the electronic control unit to operate according to a safety protocol.

22 Claims, 4 Drawing Sheets

RESCUE DEVICE

CROSS-REFERENCE TO RELATED APPLICATION

This application claims priority under Section 119(e) from U.S. Provisional Application Ser. No. 63/086,225, filed Oct. 1, 2020, entitled "RESCUE DEVICE" the contents of which is incorporated herein by reference.

BACKGROUND (a) Field

The subject matter disclosed generally relates to living compartments, including vehicles, and more precisely to safety features for living compartments, including automotive vehicles. More particularly, the subject matter disclosed relates to components adapted to provide safety features in a living compartment, including an automotive vehicle.

(b) Related Prior Art

In the field of safety features for houses and automotive vehicles, safety and safety-providing components are important aspects that are subject to innovations. More particularly, passenger's safety is an aspect that has been the subject of innovation, but for which still remains aspects to provide in relation with particular usages of the vehicle, or particular situations in relation with the vehicle, whether the vehicle being used or not at the time safety considerations need to be addressed.

There is therefore a need for continuous improvements in safety features in relation to automotive vehicles, and more particularly in relation to passenger safety in relation to these automotive vehicles.

SUMMARY

According to an embodiment, there is provided components adapted to provide safety features in a living compartment, including an automotive vehicle.

According to an embodiment, there is provided a safety system for an automotive vehicle comprising electronic control units, comprising:
  a safety module in communication with one or more sensors of the automotive vehicle and the one or more electronic control units,
  wherein the safety module, upon detection of a condition by the sensors, is designed to signal one of the electronic control unit to operate according to a safety protocol.

The safety module may be designed to initiate, to monitor and to end operation of the safety protocol.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
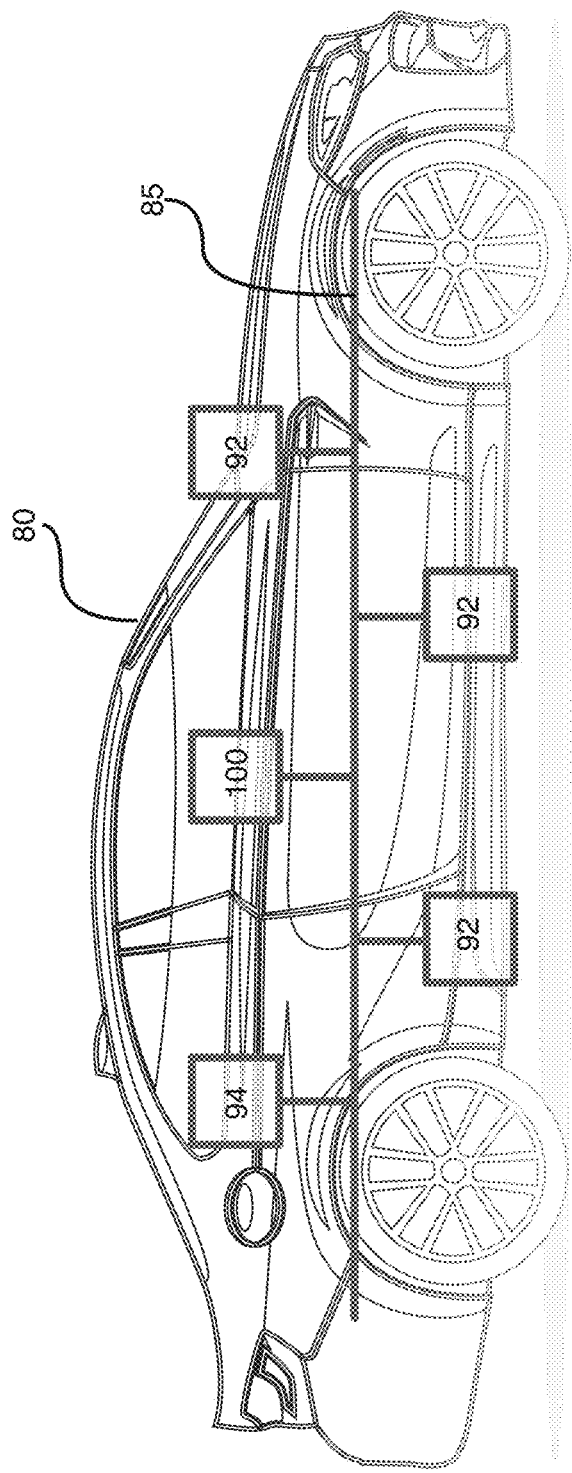
FIG. 1 is a schematic of an automatic vehicle comprising a rescue device in accordance with an embodiment.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

In the following description, it is understood that terms such as "first", "second", "top", "bottom", "above", "below", and the like, are words of convenience and are not to be construed as limiting terms.

The terms "top", "up", "upper", "bottom", "lower", "down", "vertical", "horizontal", "interior" and "exterior" and the like are intended to be construed in their normal meaning.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature. The terms "connected" and "communicating" as their variations should be understood in a similar fashion.

In realizations, there are disclosed a rescue device 100, aka safety component, safety module or safety unit, part of a safety system 90 to be installed either on an automotive vehicle 80 (a combustion-based vehicle or an electric vehicle), in a house, a trailer, or another enclosed area, with the response being adapted to the type of enclosed area.

It will be noted that throughout the appended drawings, like features are identified by like reference numerals.

It should be noted that the present rescue device 100 aims to pertain to situations such as:

Accidents. In relation to automotive vehicles, there are many accidents involving passengers, for example people, children and pets, locked in a vehicle, in idle mode or when the automotive vehicle is not working.

Safety and convenience situations. Parents, pet owners, etc., particularly when pertaining to the use of Recreational Vehicles (RVs), would sometimes leave, e.g., a pet in the, e.g., RV while the driver left the RV for, e.g., dinner.

From these situations, one requirement may be drawn that the passenger environment, aka components of the automotive vehicle or the inside of the automotive vehicle 80, needs to be safe for the passenger is all situations, both when the driver is present in the automotive vehicle 80 and when the driver leaves the automotive vehicle 80 unattended since, many times, someone will forget they have a pet or passenger in an automotive vehicle 80 and find a stressed individual or worse when they return.

Referring now to the drawings, and more particularly to FIG. 1, it depicts an automotive vehicle 80 comprising a Controller Area Network bus 85, aka CAN bus 85, allowing communication between a plurality of electronic control units 92 and electronic sensors 94 part of a system.

Figure 2:
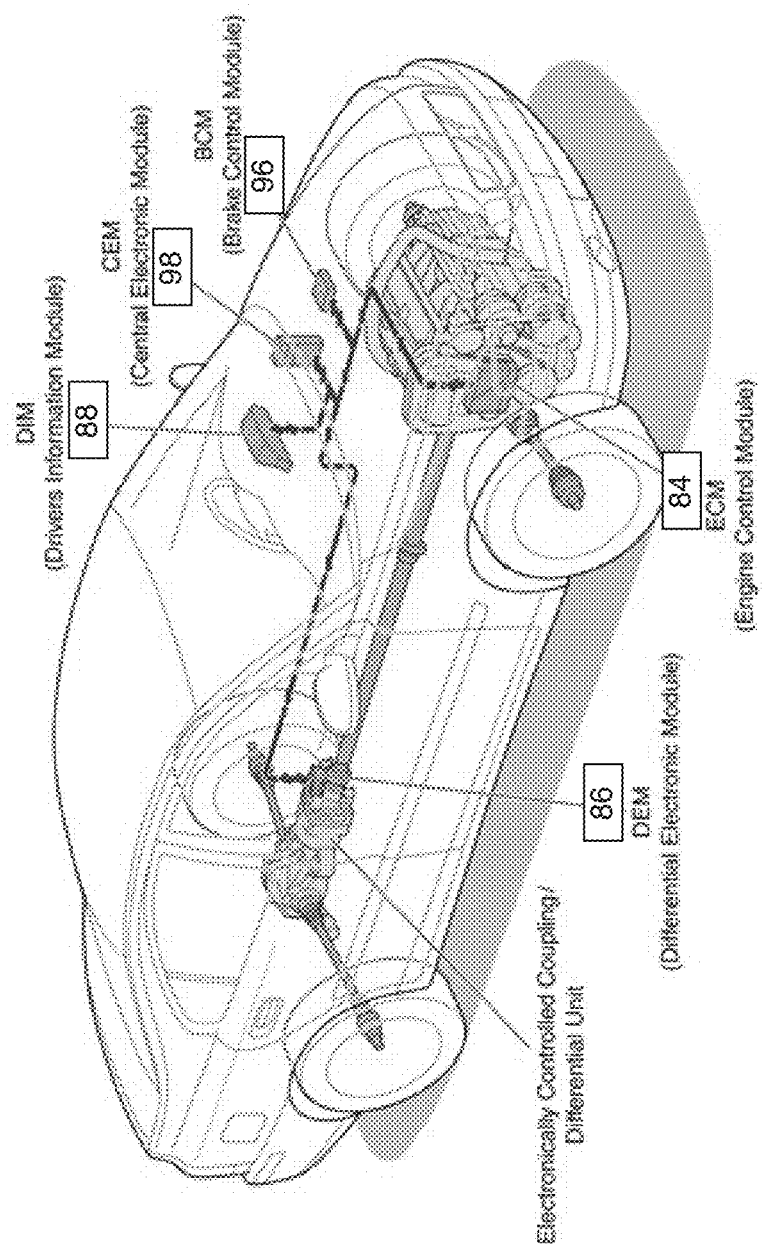
FIG. 2 is a schematic of an automotive vehicle comprising a plurality of electronic control units wherein at least some are designed to communicate with a rescue device.
Figure 3:
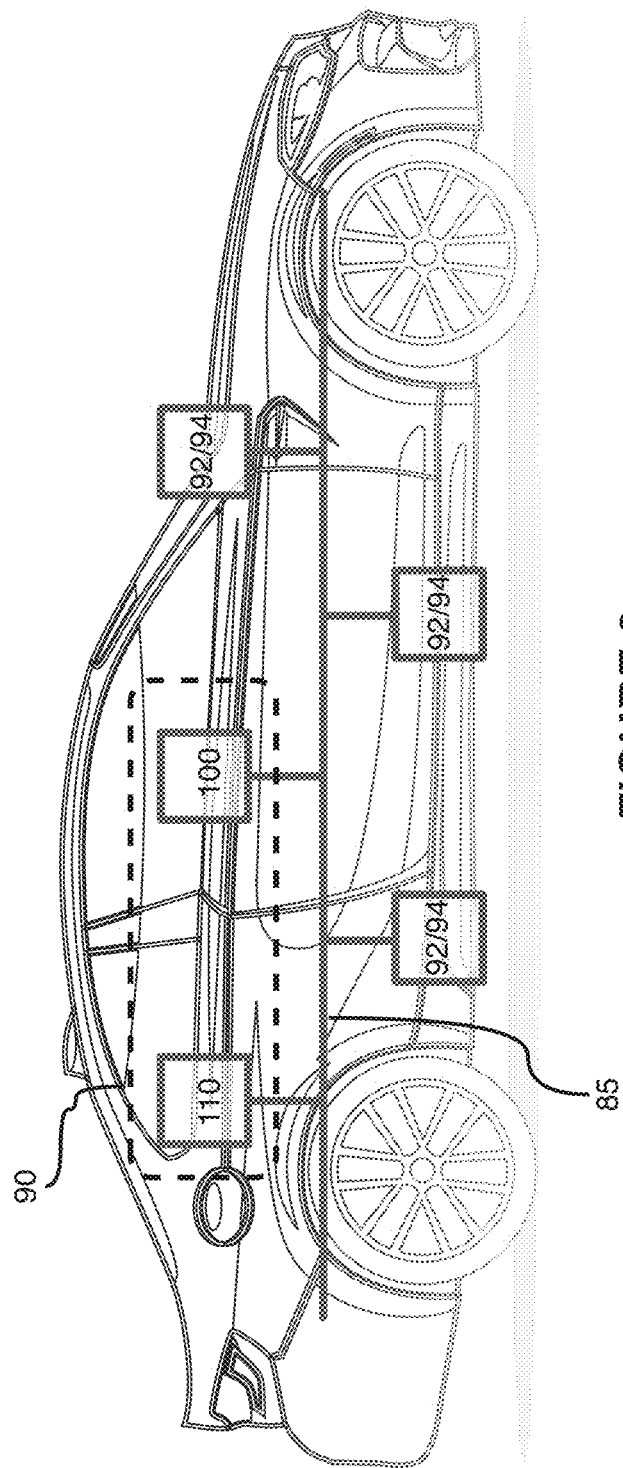
FIG. 3 is a schematic of an automatic vehicle comprising a safety system comprising a rescue device and a number from zero to a plurality of specific safety sensors.
Figure 4:
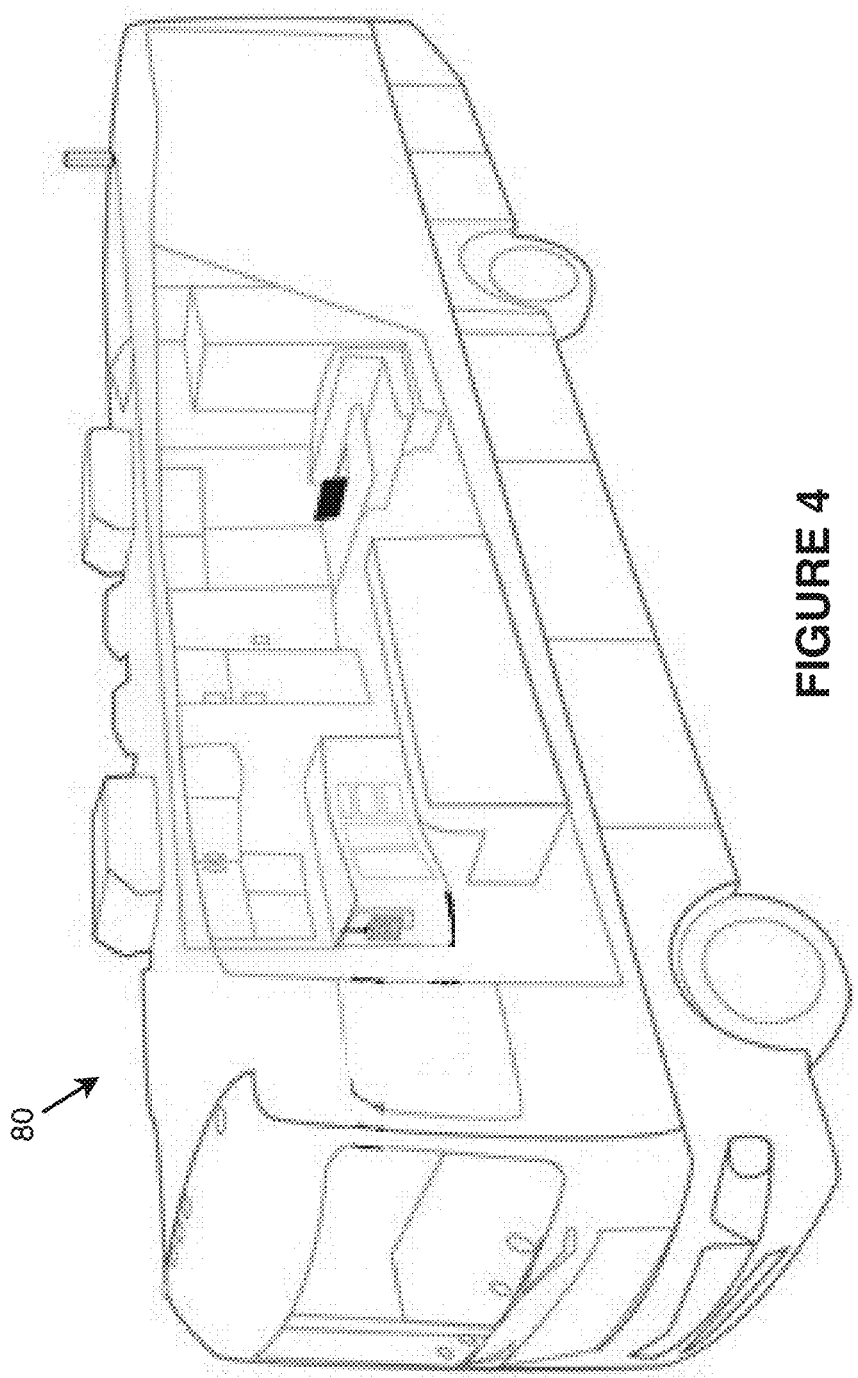
FIG. 4 is a perspective view of an exemplary Recreational Vehicle (RV).

It should be noted that FIGS. 1 to 3 depict a combustion-based car, but the same principle applies to other types of automotive vehicles, such as Sport Utility Vehicles (SUVs), light trucks and RVs (see FIG. 4) for examples.

Referring additionally to FIG. 2, the CAN bus 85 provides means for the electronic sensors 94 and electronic control units 92 to communicate with each other. Such means allow nowadays automotive vehicles 80 to have for examples an electronic differential unit 86, a driver information module 88, an engine control module 84, a brake control module 96 and a central electronic module 98 with all these electronic control units 92 and electronic sensors 94 to exchange communications.

Referring now to FIG. 3, an automotive vehicle 80 comprises a rescue device 100 in communication with another unit, e.g. the central electronic module 98, for the automotive vehicle 80 to perform some safety operations when specific conditions are detected, i.e. when safety sensors 110 communicate through the CAN bus 85 to the rescue device 100 some signals indicative of specific conditions being detected.

According to a first safety protocol, the rescue device 100 is adapted to respond to undesired conditions by communicating to either the central electronic module 98 or the engine control module 84 a signal to request the motor (not shown per se) to start.

According to a first condition for performing actions according to the first safety protocol, a battery voltage sensor (not shown) is connected to or communicating with the rescue device 100, and when the battery voltage sensor detects that the available voltage of the battery (not shown) is depleted under a threshold value, the rescue device 100 signals to, e.g., the central electronic module 98 or the engine control module 84 to start the motor, resulting in the alternator (not shown) to charge the battery.

The safety sensors 110 is adapted to either evaluate conditions based on specific sensors or to request and analyze signals from components and units to evaluate the condition, e.g. fuel tank level, transmission state, to ensure that the automotive vehicle 80 is in an appropriate state for the motor to start and run, and to be able to stop the motor when the conditions are no longer appropriate for the motor to run, e.g. when the fuel tank is depleted under a threshold level, or when the problem is solved, e.g. when the voltage of the battery reaches an acceptable value.

When the rescue device 100 is installed in an electric vehicle and designed to monitor voltage of the battery, the response will be different such as cutting off all energy consumption sources and/or sending a signal, e.g. a SMS, to the owner.

It is to be noted that the electronic control units 92 depicted on the Figures are selected for teaching purposes, and the nature of the electronic control units 92 will vary based on the nature of the enclosed area.

Similarly, alternative to CAN bus 85 may be used for communications between components of the enclosed area. For examples, for houses and trailers, an alternative may be better suited. In alternative realization, alternatives may be a Body Control module (BCM) or a Powertrain Control Module (PCM), or direct communication with such modules not involving a CAN bus 85.

Another described realization for performing actions according to a safety protocol is particularly well suited for RVs 80 (FIG. 4) for which the owners, by choice or when operating conditions render its usage mandatory, leave the heating system (not shown) or the air conditioning system (not shown) running while the motor of the RV 80 is not.

According to a similar realization, the owner of the RV 80 can set temperature limits for within the RVs 80, with the rescue device 100 communicating with the climate control system (not shown), comprising the heating system and the air conditioning system, for the appropriate component to start, and optionally the motor, when the interior temperature of the RV 80 goes outside the set range.

According to another realization for performing actions according to a second safety protocol, the rescue device 100 communicates with safety sensors 110 comprising a CO sensor (not shown). When the rescue device 100 receives signals from the CO sensor that the CO level in the passenger's compartment is over a threshold value, the rescue device 100 is adapted to signal the motor to stop running only if the automotive vehicle 80 is immobile and its transmission is on PARK.

According to another realization for performing actions according to a third safety protocol, the rescue device 100 communicates with safety sensors 110 comprising passenger compartment sensors (not shown) such as seat sensors (not shown), motion sensors (not shown) and heat sensors (not shown) used to determine if a passenger, e.g. a child or a pet, is present in the passenger's compartment and signals electronic control units 92, e.g. the climate control system or the central electronic module 98, to become active or to activate a part of the automotive vehicle 80.

An alternative response to sensor signals, aka safety protocol parameters, may be triggered by the rescue device 100, comprising triggering communication processes such as activating lights, e.g. headlights, tail lights and/or interior lights, activating the horn of the automotive vehicle 80, activating a communication device adapted to send an electronic message such as an SMS, etc.

According to a realization, particular trigger conditions and response protocols are settable by the owner, such as, to refer hereinbefore, the temperature range in relation to a climate control system and the limit voltage levels based on battery capacity of the automotive vehicle 80.

According to realizations, the rescue device 100 may respond to different conditions with different safety protocols, wherein the owner may activate and deactivate individually one or more of these safety protocols.

It should be noted that, according to realizations, the safety system 90 described herein comprises a rescue device 100 and a number varying from none to a plurality of electronic sensors 94 specific to the safety system 90, wherein the safety system 90 is connected through the CAN bus 85 with the other electronic control units 92 of the automotive vehicle 80 for a safety protocol to take place. Accordingly, the safety protocol may be initiated, monitored and ended by the rescue device 100, regardless of the number of other electronic control units 92 involved in the safety protocol.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A safety system for an automotive vehicle, the safety system comprising
   a) a first input to receive a first signal from a passenger compartment sensor associated with the automotive vehicle, the passenger compartment sensor being configured to detect a presence of a life form in the passenger compartment of the automotive vehicle,
   b) a second input to receive environmental information from an environment sensor associated with the automotive vehicle, and
   c) a control module, configured to
      i) monitor the presence of a life form in the passenger compartment and monitor the environmental information associated with the automotive vehicle to detect an occurrence of a safety condition, and
      ii) in response to detection of a life form being present in the passenger compartment and detection of an occurrence of a safety condition, send a control signal to a control system in communication with the control module to operate a safety protocol,
   wherein the safety system is configured to operate when the automotive vehicle is immobile.

2. The safety system of claim 1, wherein the life form is a person or pet.

3. The safety system of claim 1, wherein the safety protocol includes triggering a communication process.

4. The safety system of claim 3, wherein the communication process includes sending an electronic notification to the owner.

5. The safety system of claim 3, wherein the communication process includes activating lights and/or horn of the automotive vehicle.

6. The safety system of claim 1, wherein the safety protocol includes (i) sending an electronic notification to the owner and (ii) activating lights and/or horn of the automotive vehicle.

7. The safety system of claim 1, wherein the environmental information associated with the automotive vehicle includes a temperature level of the passenger compartment.

8. The safety system of claim 7, wherein the control system is a climate control system, and wherein the safety protocol includes controlling the climate control system to control the temperature of the passenger compartment.

9. The safety system of claim 8, wherein the safety protocol includes controlling the control system to activate a part of the automotive vehicle.

10. The safety system of claim 9, wherein activating a part of the automotive vehicle includes starting the automotive vehicle motor.

11. The safety system of claim 1, wherein the passenger compartment sensor includes seat sensors, motion sensors, heat sensors, or any combination thereof.

12. The safety system of claim 1, wherein the environmental information associated with the automotive vehicle includes a CO level in the passenger compartment.

13. The safety system of claim 12, wherein the safety protocol further includes controlling the automotive vehicle engine to stop running to reduce the CO level in the passenger compartment.

14. The safety system of claim 1, wherein the safety condition and the safety protocol are settable by the owner.

15. A safety system for an automotive vehicle, wherein the safety system is configured to operate when the automotive vehicle is immobile, the safety system comprising
   a) a first input to receive a first signal from a passenger compartment sensor associated with the automotive vehicle, the passenger compartment sensor being configured to detect a presence of a person or pet in the passenger compartment of the automotive vehicle,
   b) a second input to receive environmental information from an environmental sensor associated with the automotive vehicle, wherein the environmental information includes a temperature level or a CO level in the passenger compartment, and
   c) a control module, configured to
      i) monitor the presence of a person or pet in the passenger compartment and monitor the environmental information to detect an occurrence of a safety condition, and
      ii) in response to detection of a person or pet being present in the passenger compartment and detection of an occurrence of a safety condition, send a control signal to a control system in communication with the control module to operate a safety protocol.

16. The safety system of claim 15, wherein the safety protocol includes triggering a communication process.

17. The safety system of claim 16, wherein the communication process includes sending an electronic notification to the owner.

18. The safety system of claim 16, wherein the communication process includes activating lights and/or horn of the automotive vehicle.

19. The safety system of claim 15, wherein the control system is a climate control system, and wherein the safety protocol includes controlling the climate control system to control the temperature of the passenger compartment.

20. The safety system of claim 15, wherein the safety condition and the safety protocol are settable by the owner.

21. The safety system of claim 15, wherein the passenger compartment sensor includes seat sensors, motion sensors, heat sensors, or any combination thereof.

22. The safety system of claim 15, wherein the environmental information includes a CO level in the passenger compartment, and wherein the safety protocol further includes controlling the automotive vehicle engine to stop running to reduce the CO level in the passenger compartment.

* * * * *